United States Patent
Bourgeois

Patent Number: 5,172,649
Date of Patent: Dec. 22, 1992

[54] DEVICE FOR BREEDING FISH IN THE OPEN SEA

[75] Inventor: Olivier Bourgeois, Brussels, Belgium

[73] Assignee: Pisciculture Marine De Monaco, Monaco

[21] Appl. No.: 743,505

[22] Filed: Aug. 9, 1991

[30] Foreign Application Priority Data

Aug. 21, 1990 [EP] European Pat. Off. ........ 90440073.6

[51] Int. Cl.⁵ ............................................. A01K 63/00
[52] U.S. Cl. ....................................................... 119/3
[58] Field of Search ............................ 119/3; 43/7, 9.1

[56] References Cited

U.S. PATENT DOCUMENTS

| | | | |
|---|---|---|---|
| 3,691,994 | 9/1972 | McPherson | 119/3 |
| 4,610,219 | 9/1986 | Morimura | 119/3 |
| 4,712,509 | 12/1987 | Vangen | 119/3 |
| 4,886,015 | 12/1989 | Ochs | 119/3 |
| 4,957,064 | 9/1990 | Koma | 119/3 |

FOREIGN PATENT DOCUMENTS

| | | | |
|---|---|---|---|
| WO85/03411 | 8/1985 | PCT Int'l Appl. | |
| WO90/01872 | 3/1990 | PCT Int'l Appl. | |
| 1489673 | 6/1989 | U.S.S.R. | 119/3 |
| 2168231 | 6/1986 | United Kingdom | 119/3 |
| 2184631 | 7/1987 | United Kingdom | |
| 8203152 | 3/1982 | World Int. Prop. O. | 119/3 |
| 8603097 | 6/1986 | World Int. Prop. O. | 119/3 |
| 8703170 | 6/1987 | World Int. Prop. O. | 119/3 |
| 8704590 | 8/1987 | World Int. Prop. O. | 119/3 |
| 8906902 | 8/1989 | World Int. Prop. O. | 119/3 |

Primary Examiner—Gene Mancene
Assistant Examiner—Cindy A. Cherichetti

[57] ABSTRACT

Device for breeding fish in the open sea, comprising a floating cage to which is suspended a netted bag, characterized in that said frame consists in two concentric flexible frames connected by tensioned radial elements, a netted bag being suspended to each closed area delimited by two successive radial elements and the corresponding frame sections, forming an individual net pen.

33 Claims, 10 Drawing Sheets

DEVICE FOR BREEDING FISH IN THE OPEN SEA

The invention relates to a floating device adapted to fish farming in the open sea, of the general type comprising at least one net delimiting a closed area of sea water forming a cage in which the breeding of fishes can be effected.

Devices of this type have already been described, e.g. in WO 86/03,097, WO 85/03411 and the like.

They generally comprise a floating frame made of one or two flexible rubber hoses defining a polygonal or circular area and to which a netted bag is suspended providing a closed amount of sea water when immersed into the open sea, usable as a cage for breeding fishes and which can be displaced and moored in any location.

Such devices, presently in use as cylindrical cages of a diameter 15-40 m, or polygonal cages with sides of length 10-20 m, are usually sufficient but suffer serious drawbacks:

They are depending on the mooring line tensions for their ability to keep their shape in the horizontal plane against deformation forces.

It is only possible to breed in one cage fishes of the same species and generally of the same size.

In such large cages, it is difficult to provide all the fishes with an equally distributed amount of feed.

Some species of fish have a tendency to cannibalism, so that they should be isolated in batches of homogeneous size, which needs a large number of essentially individual cages, to be separately displayed, moored and maintained, at high costs where water depths are large.

This invention provides a new device of this type in which all such drawbacks are eliminated. Such result is obtained by:

Installing within the internal area as defined by the floating frame a second floating frame, of smaller size but parallel (concentric) to the first frame, and connecting both frames by radial connecting elements, so that all forces exerted upon the device are evenly distributed, which prevents any distortion of the overall structure even in case of breakage of all or part of the moorings.

To said structure are suspended nets, so that the new device comprises a series of individual cages in shape of a cylindrical sector delimited by two radial connecting elements and the two corresponding sectins of both frames.

Such new device has none of the above drawbacks, but it has also further advantages:

Each radial connecting element is constituted by a chain, cable or rope arrangement which when in tension provides the opposing restoring force against deformation. Above this connecting element is an assembly of floating cubes flexibly linked so that they are forming an horizontal upper face usable as a walkway from one frame to the other. Such an assembly allows to the structure some flexibility on the vertical plane, while it is essentially stiff and self-supporting on the horizontal plane.

Each floating frame is usually made of a hose of a proper diameter, providing on its upper surface a peripheral walkway. According to a preferred modification, said frame is made of a series of circular hose sections assembled by bolted metal flanges which can be used for attaching the mooring chains at the external part of the device, and for attaching ropes, chains or cables joining at the two frames and at the center of the device at the internal part thereof.

Due to the distribution of the forces through said chains and ropes, any distortion of the device is immediately balanced and compensated, the shape of the device being therefore constantly kept.

Platforms can be mounted upon said flanges providing a passageway from one net section to another and to the corresponding walkways above the connecting elements.

The invention is now being described with reference to the attached drawing, in which.

Figure 7:
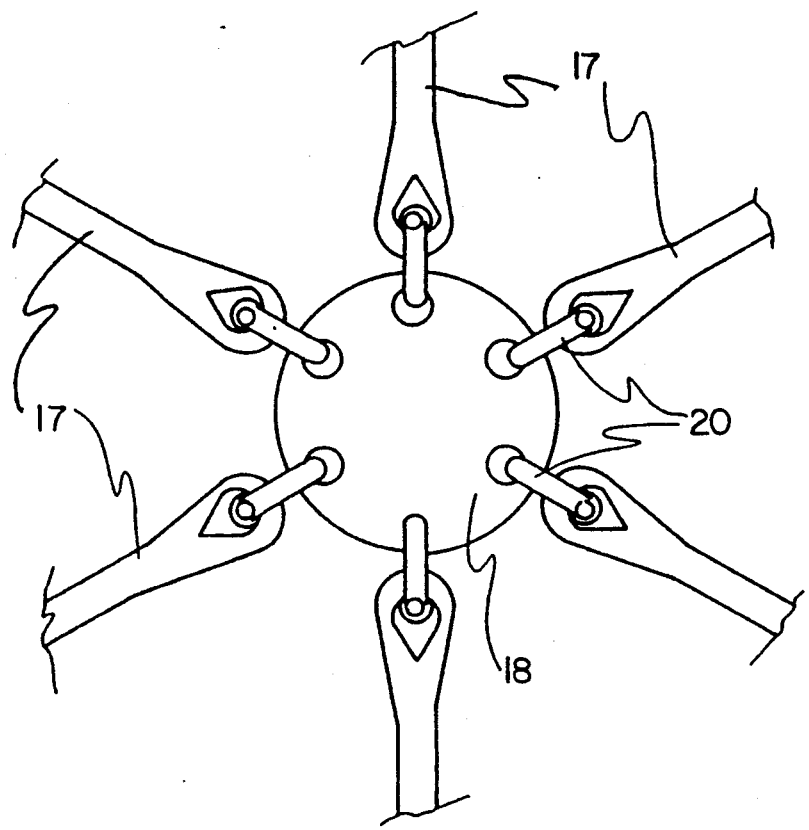
FIG. 7 is a top view of the central plate of the device.
Figure 7A:
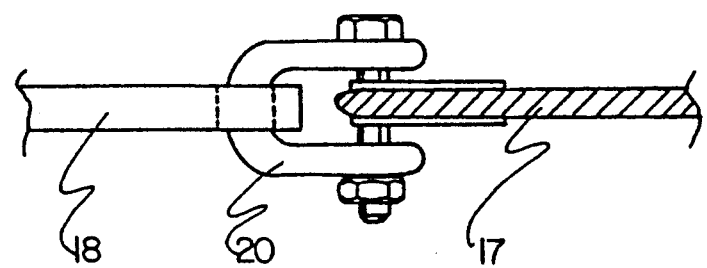

FIG. 7 A is a detail of FIG. 7.

Referring to FIGS. 1, 1A, 2, 2A and 3, it is shown a device comprising an external floating frame 1 and an internal floating frame 2, each consisting in a flexible rubber hose. It should be understood that, inasmuch said device can have a diameter of about 20-50 m, the diameter of said hoses are of about 1 m, so that they provide a satisfactory walkway around the device. However, if necessary, an additionnal walkway can be provided, such as a surface as shown by 3 on FIGS. 1 and 2.

Connecting elements 4 radially connect frames 1 and 2. The structure of said connecting elements 4 will be described hereunder with reference to FIGS. 5 and 6.

Figure 1:
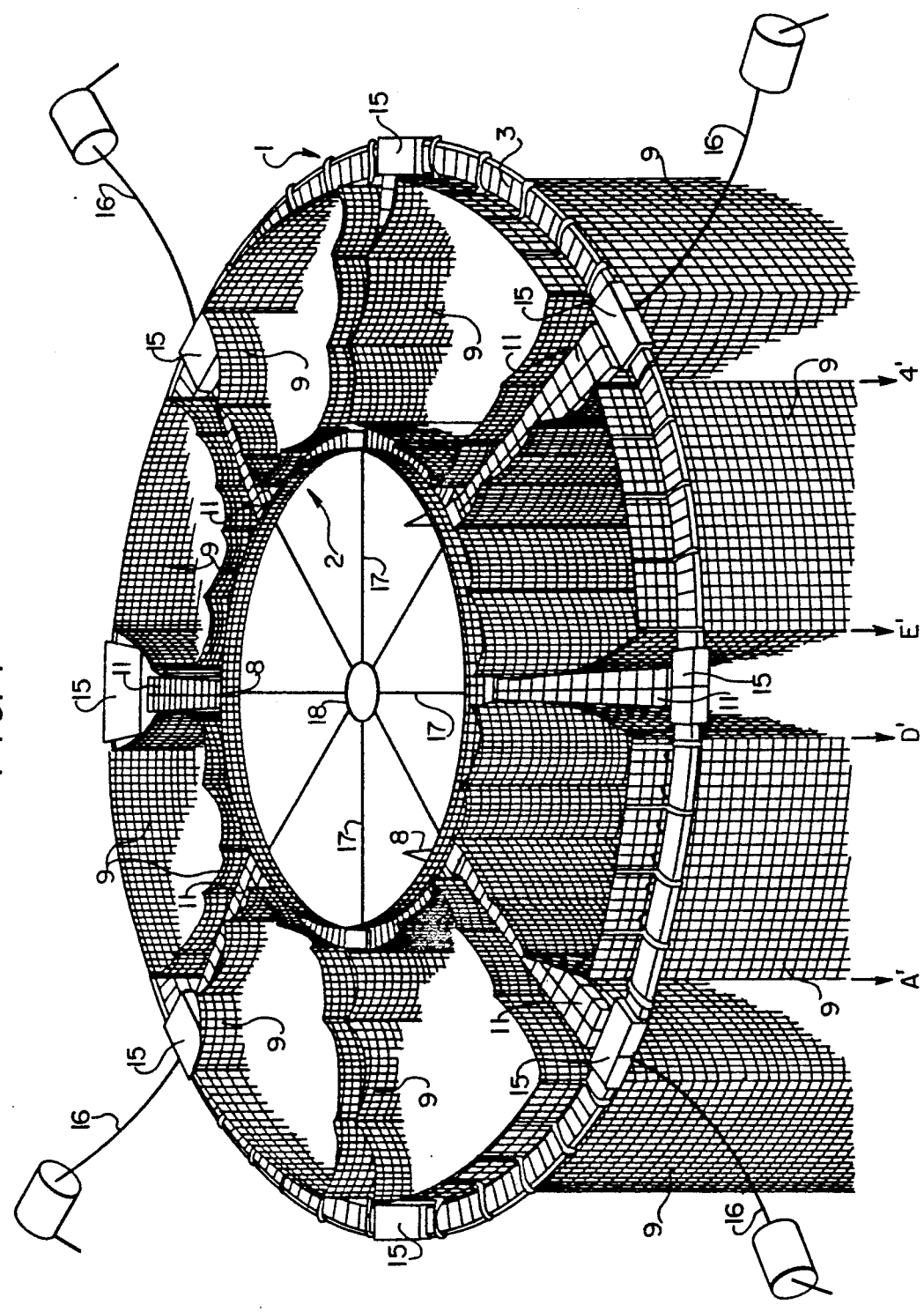
FIG. 1 is a perspective view of a device according to the invention.
Figure 1A:
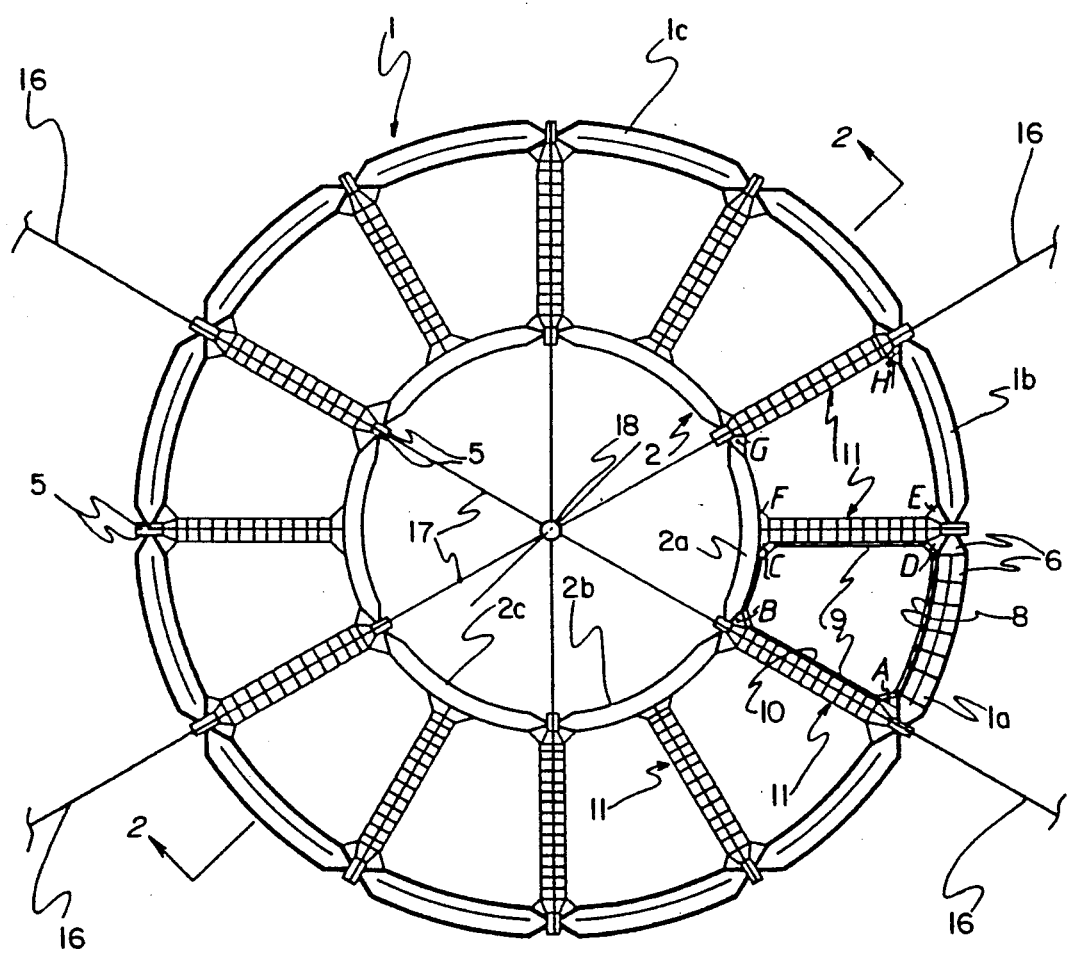
FIG. 1A is a schematical top view of said device.

As shown on FIG. 1A, each hose forming the frames 1 and 2 comprises sections 1a, 1b, 1c . . . and 2a, 2b, 2c . . . said sections being assembled by metal flanges 5, as described with reference to FIGS. 5 and 6.

Figure 2:
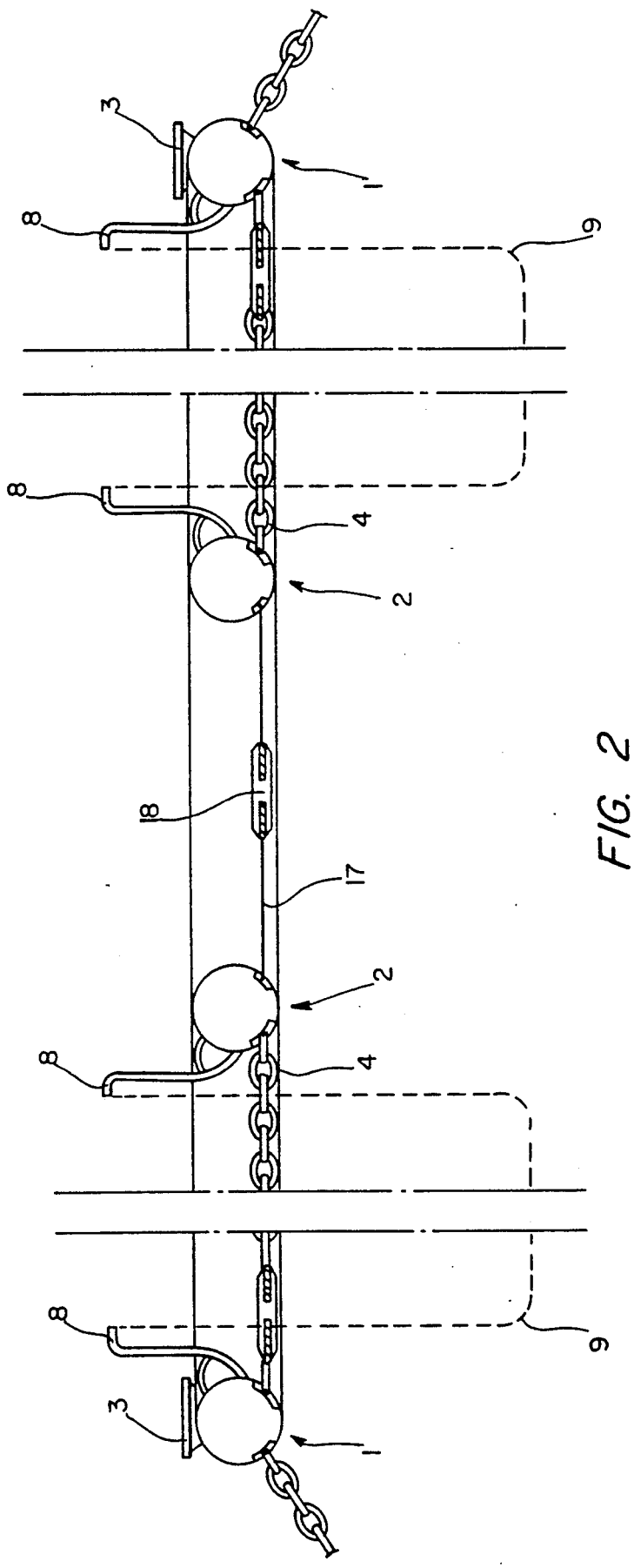
FIG. 2 is a vertical section along 2—2 of FIG. 1A.
Figure 2A:
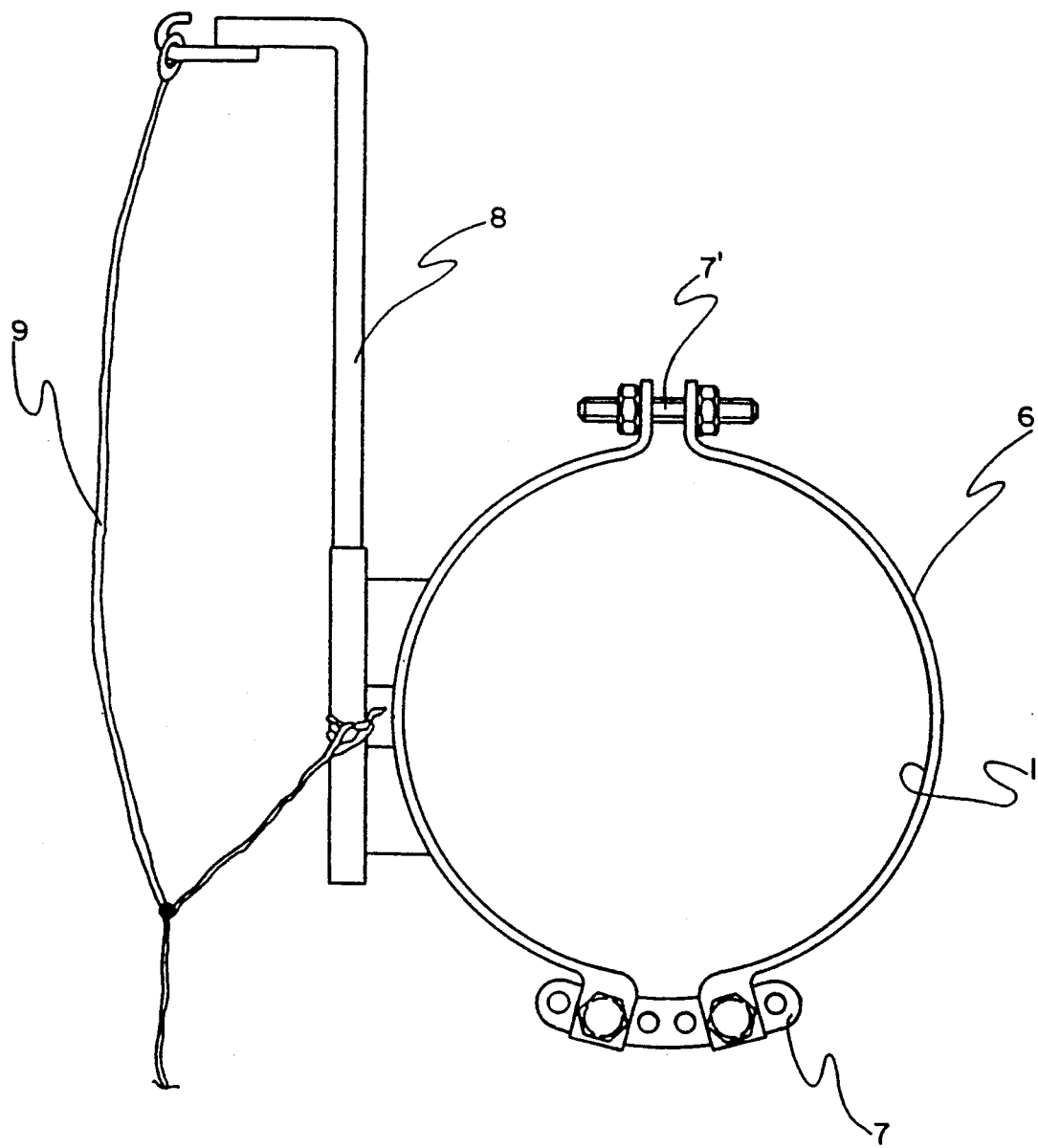
FIG. 2A is an enlarged view of a detail of FIG. 2.
Figure 3:
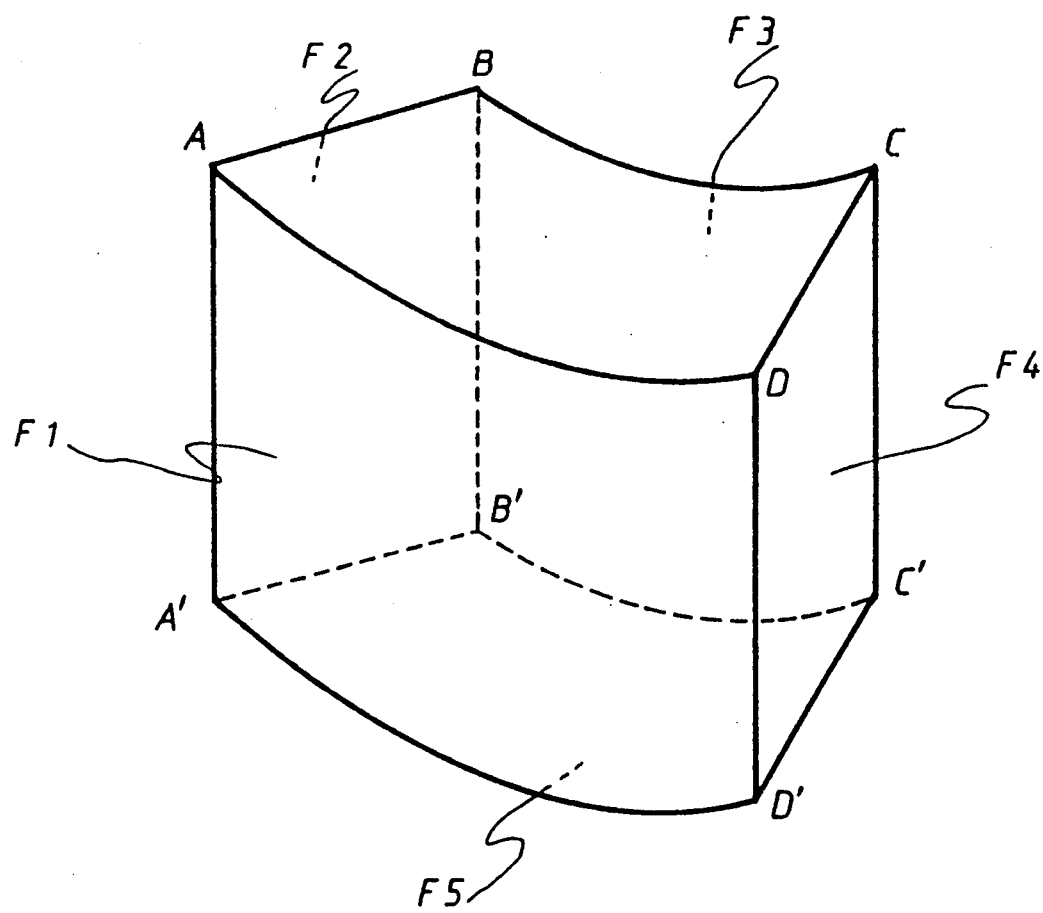
FIG. 3 shows schematically the shape of an individual cage in the device of the invention.

Along each hose section 1a, 1b, . . . 2a, 2b . . . , are tightly mounted metal clamps 6, as shown on FIG. 2A, which can be adjusted as shown in 7—7' on FIG. 2A. To said clamps are mounted vertical stanchions 8. Said stanchions are used for the installation of nets 9 in the shape of bags hanging from the periphery of each frame section defined by one section 1a of frame 1, one section 2a of frame 2 and the two corresponding connecting elements 4. On FIG. 1-1A, two of said sections are shown as ABCD and EFGH. Each of said individual net is obviously closed at its bottom, as shown as A' B' C' D' and E' F' G' H' on FIG. 1, and constitutes a cage $V_1$ as shown on FIG. 3, said cage having faces $F_1$, $F_2$, $F_3$, $F_4$ and $F_5$.

Figure 4:
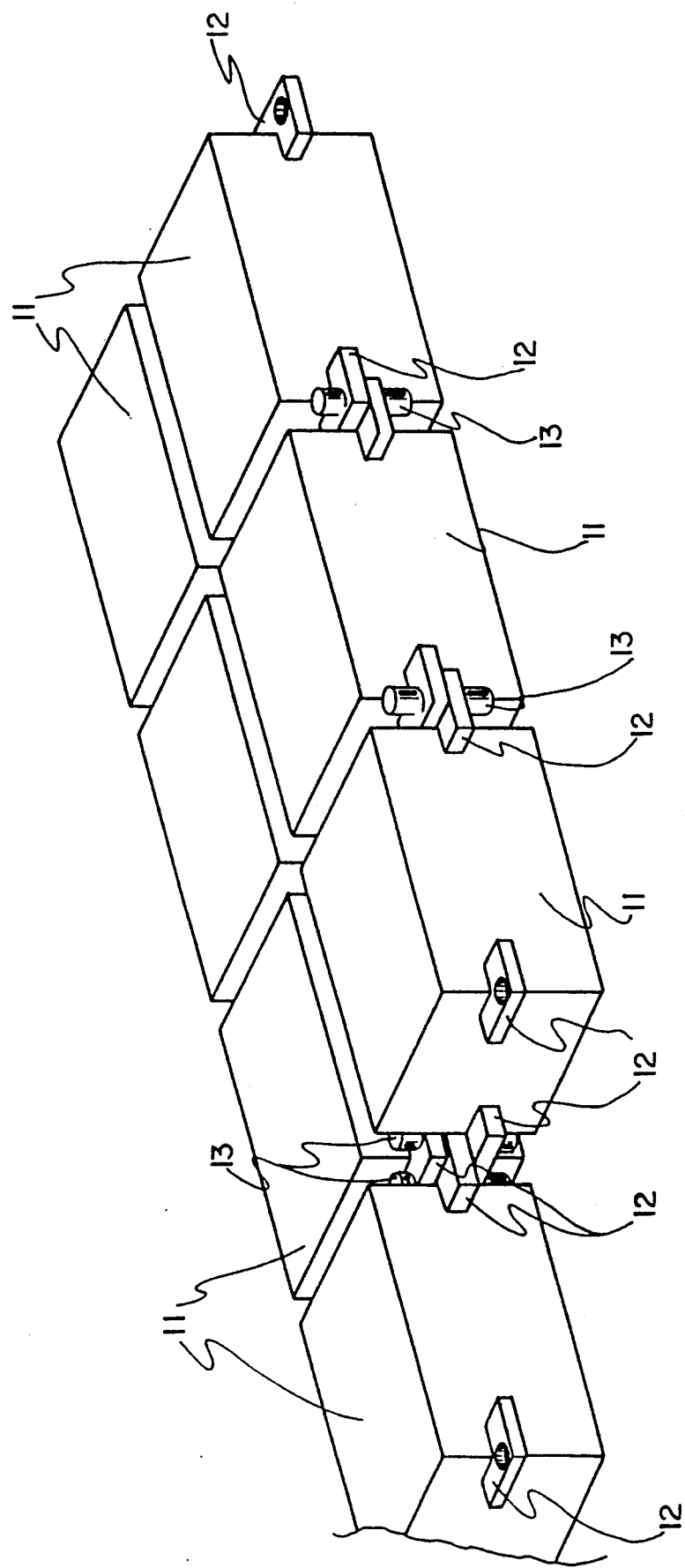
FIG. 4 is a schematical perspective view of the walkway above a connecting element.
Figure 4A:
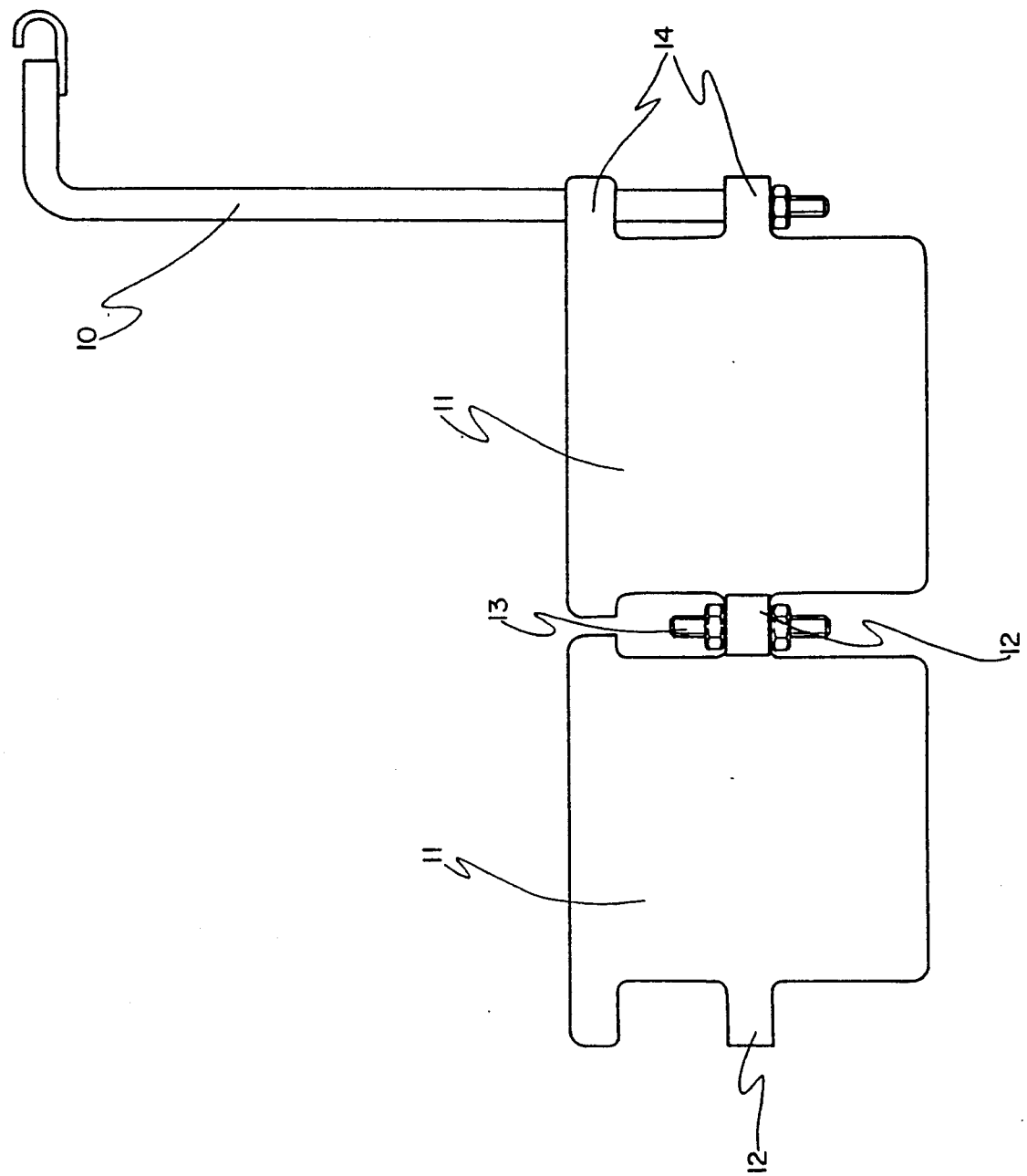
FIG. 4A is a vertical cross section of a walkway above a connecting element.

Stanchions 10 similar to stanchions 8 are used with walkways elements 11 to hang the net along said walkways 11 as shown on FIG. 4A.

Above each connecting element 4 is a flexible assembly of hollow or filled plastic cubes 11 made of polystyrene foam or the like. As shown on FIG. 4A said cubes are provided with ears 12 for being assembled with vertical rods 13. The overall structure is therefore comparatively flexible. Similar ears 14 are used for attaching the stanchions 10 to the outer faces of the cubes 11.

Figure 5:
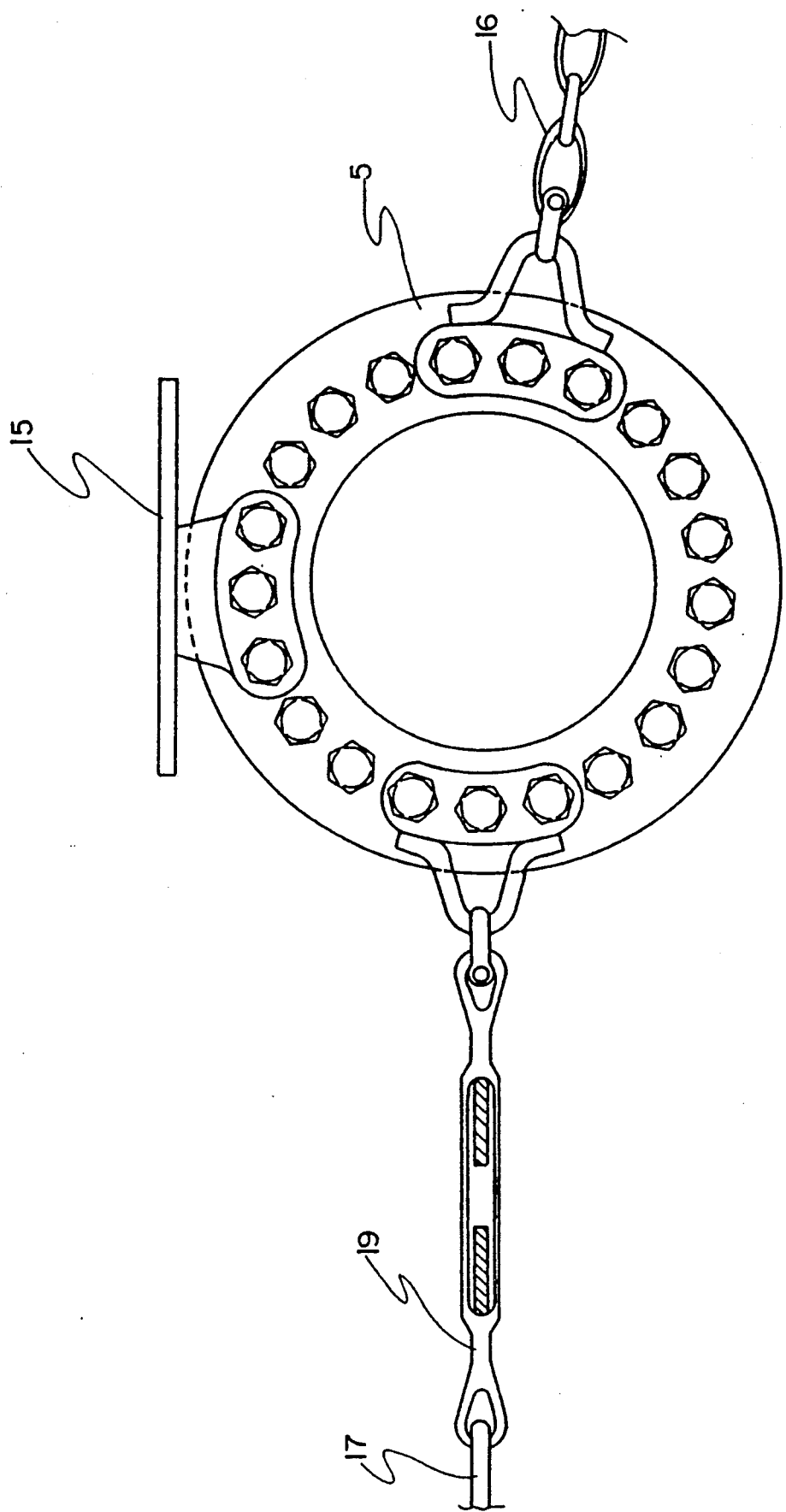
FIG. 5 is a front view of a flange used to connect two hose sections.
Figure 6:
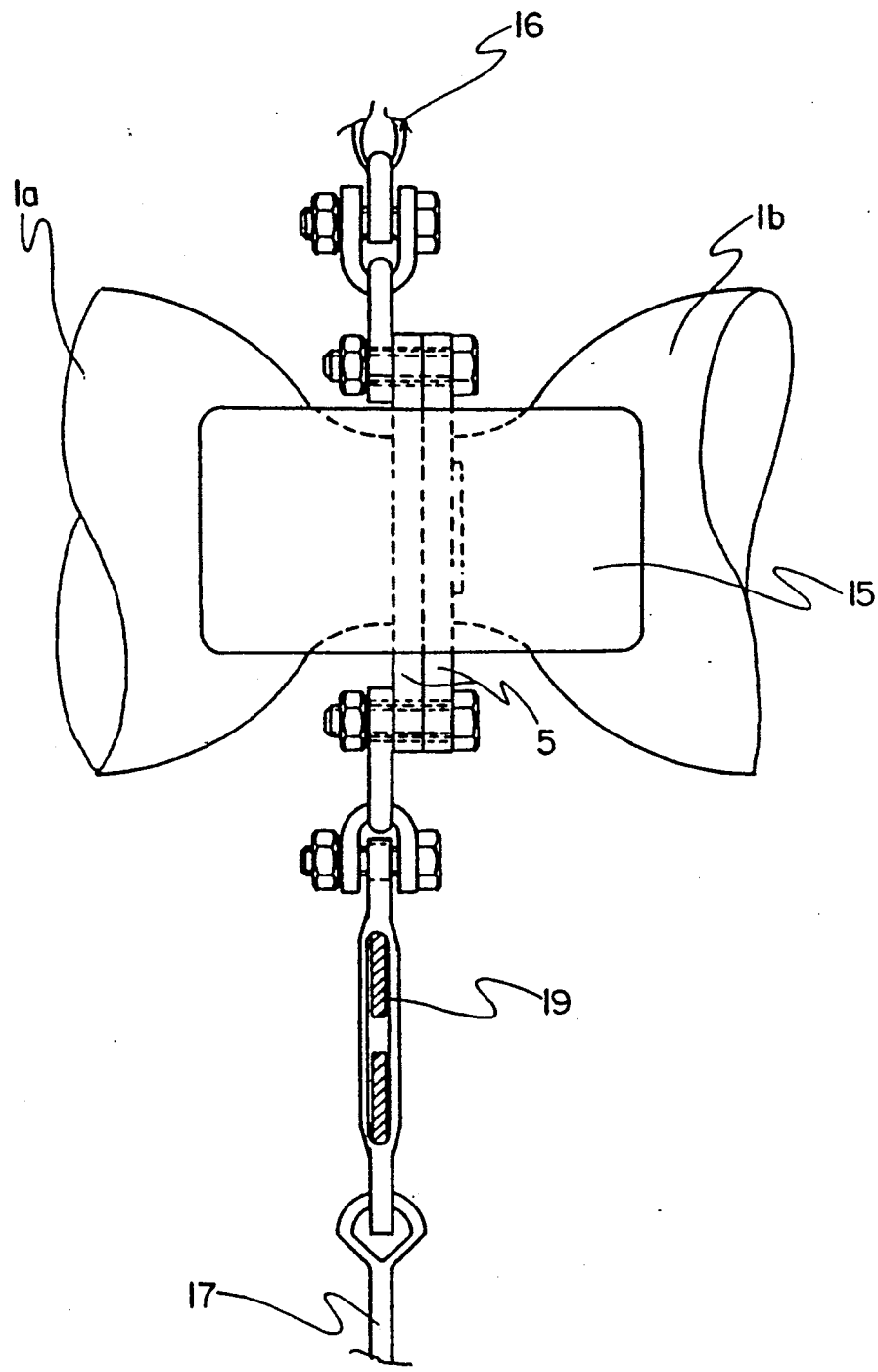
FIG. 6 is a top view of FIG. 5.

As shown on FIGS. 5 and 6, each flange 5 has several purposes. In the first place, to the top of the flange it can be mounted a platform 15, making easier access to the cage from a boat and providing access between each hose section and to the walkway cubes 11 above each connecting element.

Secondly, when the flange is on the inner frame 2, there are attached the connecting elements 4, which comprise cables or chains under tension 17 joining at a central plate 18 as shown on FIGS. 1, 1A, 7 and 7A. There are also attached cables or chains under tension 16 joining the inner frame to the outer frame along the radial line. The tension of said cables is adjustable by a tensor 19, to ensure the proper stiffness of the structure. The cables or chains 17 connecting at the centre are attached to the plate 18 by shackles 20 when the flange is on the outer frame 1, there are attached the chain or cable connecting to the inner flange and the mooring chains or ropes.

An important feature of the invention is in fact said ability thereof to remain stiff on the horizontal plane, due to said cable connections and however relatively flexible on the vertical plane due to the structure of the frames and the connecting elements 4.

The device of the invention can therefore follow the average normal swell but cannot be permanently distorted neither by the waves nor by a breakage of a mooring line, the overall structure being constantly balanced and recovering immediately its shape. The structure can therefore be said self-supporting and non-deforming.

Some modifications can be made to this structure within the scope of the invention:

The structure can comprise further net pens, in the central section internal to the inner frame 2.

The central platform 18 can be replaced by a larger floating platform structure to be used for the services and commodities of the device such as blowing apparatuses for introduction of air in the cages and feed into the net pens, location of central sensors and the like. Other nets and closures can be provided within the net pens to have the same divided in smaller sections.

The device of the invention can be used as a plant for fish farming in the open sea, controlled from an accompanying ship, or adjacent to a dyke along the shore.

I claim:

1. A device for breeding fish in the open sea, comprising:
    a floating cage comprising concetric inner and outer flexible frames and a plurality of tensioned radial elements connecting said flexible frames, each two successive radial elements and said flexible frames therebetween defining a closed area; and
    a netted bag suspended from each said closed area to form an individual net pen; wherein:
    each said frame comprises a series of sections of rubber hose and a plurality of metallic flanges bolted together, said sections of rubber hose being connected by pairs of said metallic flanges assembled together; and
    each said tensioned radial element comprises adjustable tensioned chains connected to said frames at said flanges.

2. The device of claim 1, further comprising a walkway above or beside each said radial element, said walkway comprising a plurality of floating units connected to each other by lug and pin devices, said units being made of plastic.

3. The device of claim 2, wherein said units are cubes.

4. The device of claim 3, further comprising stanchions mounted on the external sides of said cubes along each said radial element and supporting said net.

5. The device of claim 1, further comprising a central plate and connecting elements joining at said central plate and attached to said flanges.

6. The device of claim 5, wherein said connecting elements comprise mooring chains.

7. The device of claim 5, wherein said connecting elements comprise cables.

8. The device of claim 5, wherein said connecting elements are adjustably tensioned.

9. The device of claim 1, further comprising:
    clamps mounted around each said section of hose; and
    stanchions fixed to said clamps along said frames and supporting said net.

10. The device of claim 1, wherein said inner frame has a central area therewithin, and said device further comprising net pens in said central area.

11. The device of claim 10, further comprising additional nets and closures dividing said net pens into smaller sections.

12. The device of claim 1, further comprising a floating platform positioned within said inner frame and connecting elements joining at said floating platform and attached to said flanges, said floating platform including a utilities station.

13. A device for breeding fish in the open sea, comprising:
    a floating cage comprising concentric inner and outer flexible frames and a plurality of tensioned radial elements connecting said flexible frames, each two successive radial elements and said flexible frames therebetween defining a closed area, and each said frame comprising a series of sections of rubber hose and a plurality of metallic flanges bolted together, said sections of rubber hose being connected by pairs of said metallic flanges assembled together;
    a netted bag suspended from each said closed area to form an individual net pen; and
    a platform mounted on each assembled pair of flanges.

14. The device of claim 13, further comprising a central plate and connecting elements joining at said central plate and attached to said flanges.

15. The device of claim 14, wherein said connecting elements comprise mooring chains.

16. The device of claim 14, wherein said connecting elements comprise cables.

17. The device of claim 14, wherein said connecting elements are adjustably tensioned.

18. The device of claim 13, further comprising:
    clamps mounted around each said section of hose; and
    stanchions fixed to said clamps along said frames and supporting said net.

19. The device of claim 13, wherein said inner frame has a central area therewithin, and said device further comprising net pens in said central area.

20. The device of claim 19, further comprising additional nets and closures dividing said net pens into smaller sections.

21. The device of claim 13, further comprising a floating platform positioned within said inner frame and connecting elements joining at said floating platform and attached to said flanges, said floating platform including a utilities station.

22. Device for breeding fish in the open sea, comprising:
- a floating cage comprising concentric inner and outer flexible frames and a plurality of tensioned radial elements connecting said flexible frames, each two successive radial elements and said flexible frames therebetween defining a closed area; and
- a netted bag suspended from each said closed area to form an individual net pen; wherein:
- each said frame comprises a series of sections of rubber hose and a plurality of metallic flanges bolted together, said sections of rubber hose being connected by pairs of said metallic flanges assembled together; and
- each said tensioned radial element comprises adjustable tensioned cables connected to said frames at said flanges.

23. The device of claim 22, further comprising a walkway above or beside each said radial element, said walkway comprising a plurality of floating units connected to each other by lug and pin devices, said units being made of plastic.

24. The device of claim 23, wherein said units are cubes.

25. The device of claim 24, further comprising stanchions mounted on the external sides of said cubes along each said radial element and supporting said net.

26. The device of claim 22, further comprising a central plate and connecting elements joining at said central plate and attached to said flanges.

27. The device of claim 26, wherein said connecting elements comprise mooring chains.

28. The device of claim 26, wherein said connecting elements comprise cables.

29. The device of claim 26, wherein said connecting elements are adjustable tensioned.

30. The device of claim 22, further comprising:
- clamps mounted around each said section of hose; and
- stanchions fixed to said clamps along said frames and supporting said net.

31. The device of claim 29, wherein said inner frame has a central area therewithin, and said device further comprising net pens in said central area.

32. The device of claim 31, further comprising additional nets and closures dividing said net pens into smaller sections.

33. The device of claim 22, further comprising a floating platform positioned within said inner frame and connecting elements joining at said floating platform and attached to said flanges, said floating platform including a utilities station.

* * * * *